United States Patent
Sharma et al.

(10) Patent No.: US 11,682,029 B2
(45) Date of Patent: Jun. 20, 2023

(54) SYSTEMS AND METHODS FOR SCORING USER REACTIONS TO A SOFTWARE PROGRAM

(71) Applicant: LexisNexis, a division of Reed Elsevier Inc., Miamisburg, OH (US)

(72) Inventors: Sanjay Sharma, Mason, OH (US); Vaqar Khamisani, Sandhurst (GB); Michael Sluterbeck, Dayton, OH (US); Gabriel Hughes, London (GB); Ray Daley, Springboro, OH (US); Jamie Buckley, Campbell, CA (US)

(73) Assignee: LexisNexis, a division of Reed Elsevier Inc., Miamisburg, OH (US)

(*) Notice: Subject to any disclaimer, the term of this patent is extended or adjusted under 35 U.S.C. 154(b) by 821 days.

(21) Appl. No.: 15/934,445

(22) Filed: Mar. 23, 2018

(65) Prior Publication Data

US 2019/0295105 A1     Sep. 26, 2019

(51) Int. Cl.
*G06Q 30/0201* (2023.01)
*G06F 8/77* (2018.01)
(Continued)

(52) U.S. Cl.
CPC ........... *G06Q 30/0201* (2013.01); *G06F 8/77* (2013.01); *G06N 20/00* (2019.01); *G06Q 30/0203* (2013.01)

(58) Field of Classification Search
CPC .................................................. G06Q 30/0201
See application file for complete search history.

(56) References Cited

U.S. PATENT DOCUMENTS 7,958,010 B2   6/2011  Huang
8,396,737 B2   3/2013  Lakshminarayan et al.
(Continued)

FOREIGN PATENT DOCUMENTS

CN   1963816 A      5/2007
CN   105573887 A    5/2016
(Continued)

OTHER PUBLICATIONS

Leonard Goobar, Machine learning based image classification of electronic components (Year: 2013).*
(Continued)

*Primary Examiner* — Andre D Boyce
(74) *Attorney, Agent, or Firm* — Dinsmore & Shohl LLP

(57) ABSTRACT

Systems, methods, and computer-readable media for scoring an individual interaction session between a user and a software program are disclosed. A method includes recording, by a processing device, one or more actions undertaken by the user with the software program to obtain recorded session data, determining, by the processing device in real-time, one or more metrics that correspond to at least one of the one or more actions undertaken by the user with the software program, measuring, by the processing device, the one or more actions undertaken by the user based on the one or more metrics to obtain metric data, and providing, by the processing device, the recorded session data and the metric data as an input for one or more of a machine learning algorithm and a predictive analytic algorithm. The one or more of the machine learning algorithm and the predictive analytic algorithm scores the individual interaction session.

20 Claims, 10 Drawing Sheets

(51) Int. Cl.
*G06Q 30/0203* (2023.01)
*G06N 20/00* (2019.01)

(56) References Cited

U.S. PATENT DOCUMENTS

| | | | |
|---|---|---|---|
| 8,429,750 B2 | 4/2013 | Bennett | |
| 9,159,083 B1 | 10/2015 | Johnson et al. | |
| 9,195,944 B1 | 11/2015 | Ofitserov | |
| 9,336,268 B1* | 5/2016 | Moudy | G06F 16/24578 |
| 10,992,631 B1* | 4/2021 | Gerth | G06Q 50/01 |
| 2006/0212265 A1 | 9/2006 | Amitay et al. | |
| 2007/0192163 A1* | 8/2007 | Barr | G06Q 30/0203 |
| | | | 705/7.32 |
| 2015/0006294 A1* | 1/2015 | Irmak | G06Q 50/01 |
| | | | 705/14.66 |
| 2015/0269609 A1* | 9/2015 | Mehanian | G06Q 30/0254 |
| | | | 705/14.45 |
| 2015/0324361 A1 | 11/2015 | Glass et al. | |
| 2015/0350338 A1* | 12/2015 | Barnett | H04L 67/22 |
| | | | 709/203 |
| 2016/0139885 A1 | 5/2016 | Dube et al. | |
| 2016/0241579 A1* | 8/2016 | Roosenraad | G06F 16/9535 |
| 2017/0185669 A1* | 6/2017 | Chang | G06F 16/683 |
| 2017/0213225 A1 | 7/2017 | Gebhardt et al. | |
| 2018/0034758 A1 | 2/2018 | Whitnah et al. | |

FOREIGN PATENT DOCUMENTS

| | | |
|---|---|---|
| EP | 2021995 | 6/2007 |
| WO | 2016115944 A1 | 7/2016 |

OTHER PUBLICATIONS

Swati Pandey et al, Costomization of Recommendation System Using Collaborative Filtering Algorithm on Cloud Using Mahout, IJRET: International Journal of Research in Engineering and Technology, vol. 03 Special Issue: 07, pp. 39-43 (Year: 2014).*

Mingang Chen et al, Performance Evaluation of Recommender Systems, International Journal of Performability Engineering vol. 13, No. 8, Dec. 2017, pp. 1246-1256 (Year: 2017).*

PCT International Search Report and Written Opinion of the International Searching Authority for PCT/US19/21625, dated Jun. 17, 2019, 10 pages.

Supplementary European Search Report issued in corresponding European Application No. 19770405.9 dated Jul. 12, 2021.

* cited by examiner

SYSTEMS AND METHODS FOR SCORING USER REACTIONS TO A SOFTWARE PROGRAM

BACKGROUND

Field

The present specification generally relates to monitoring a user's interaction with a software program and, more particularly, to monitoring the user and determining in real-time whether the user's reaction to the software program is positive or negative.

Technical Background

Currently, systems and methods that score user interaction with a software program for the purposes of determining the user's reaction to the software program only provide lagging indicators of the user's interaction. That is, the systems and methods are only able to score the user interaction (i.e., whether it was positive or negative) after a user's session on the software program has finished.

SUMMARY

In one embodiment, a method for scoring an individual interaction session between a user and a software program includes recording, by a processing device, one or more actions undertaken by the user with the software program to obtain recorded session data, determining, by the processing device in real-time, one or more metrics that correspond to at least one of the one or more actions undertaken by the user with the software program, measuring, by the processing device, the one or more actions undertaken by the user based on the one or more metrics to obtain metric data, and providing, by the processing device, the recorded session data and the metric data as an input for one or more of a machine learning algorithm and a predictive analytic algorithm. The one or more of the machine learning algorithm and the predictive analytic algorithm scores the individual interaction session.

In another embodiment, a system that scores an individual interaction session between a user and a software program includes a processing device and a non-transitory, processor-readable storage medium having one or more programming instructions stored thereon. The one or more programming instructions, when executed, cause the processing device to record one or more actions undertaken by the user with the software program to obtain recorded session data, determine one or more metrics that correspond to at least one of the one or more actions undertaken by the user with the software program, measure the one or more actions undertaken by the user based on the one or more metrics to obtain metric data, and provide the recorded session data and the metric data as an input for one or more of a machine learning algorithm and a predictive analytic algorithm. The one or more of the machine learning algorithm and the predictive analytic algorithm scores the individual interaction session.

In yet another embodiment, a non-transitory, computer-readable storage medium is operable by a computer to score an individual interaction session between a user and a software program. The non-transitory, computer-readable storage medium includes one or more programming instructions stored thereon for causing a processing device to record one or more actions undertaken by the user with the software program to obtain recorded session data, determine one or more metrics that correspond to at least one of the one or more actions undertaken by the user with the software program, measure the one or more actions undertaken by the user based on the one or more metrics to obtain metric data, and provide the recorded session data and the metric data as an input for one or more of a machine learning algorithm and a predictive analytic algorithm. The one or more of the machine learning algorithm and the predictive analytic algorithm scores the individual interaction session.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
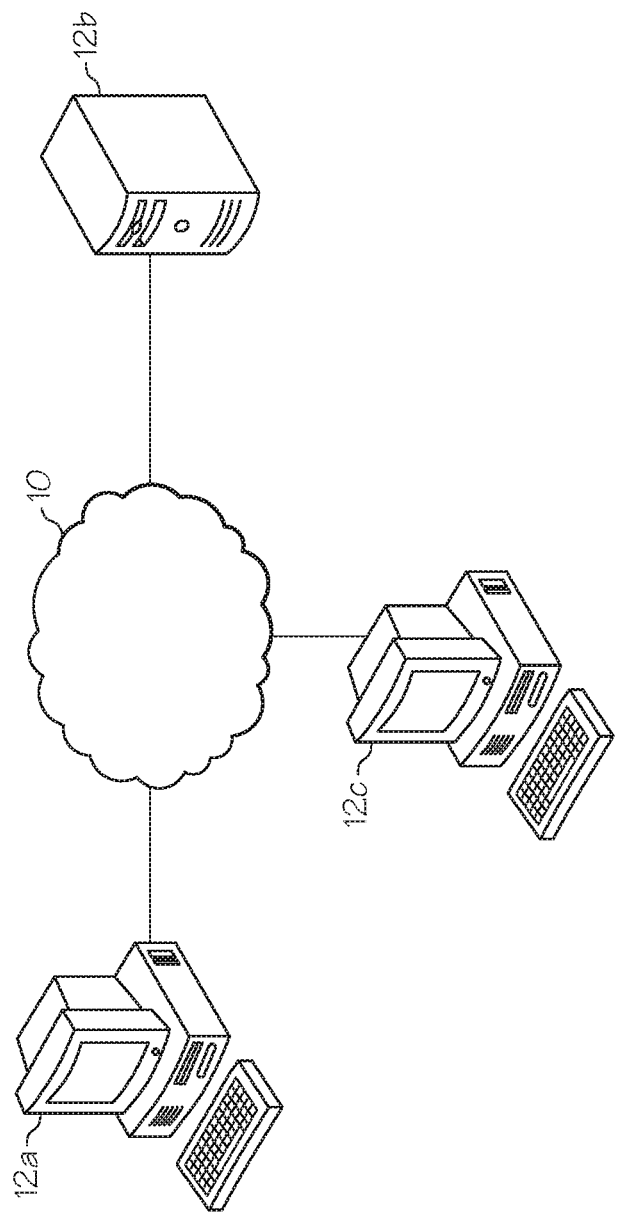
FIG. 1 schematically depicts an illustrative computing network for a system for scoring a user's interaction with a software program in real time according to one or more embodiments shown and described herein.

A need exists for systems and methods that provide predicting indicators of a user's interaction with a software program in real time. Accordingly, referring generally to the figures, embodiments described herein are directed to systems, methods, and computer-readable media for measuring, in real-time, a user's interaction with a software product in order to determine the user's satisfaction with the software product. The systems, methods, and computer-readable media described herein measure the user's interaction by recording a user interaction session and determining and observing one or more metrics that are used as indicators of the user's satisfaction. The observed metrics are then combined with the user's post-session feedback (if any) to obtain a score. The score can then be aggregated with other scores, and the aggregate can be used to determine how users responded to particular features of a software product and for predicting how users may respond in the future (either to the same features or to proposed new features)

Certain testing methods for evaluating a user's interaction with a software product may utilize A/B testing, which may also be referred to as split testing. A/B testing involves comparing two versions of a software program (e.g., a webpage or website) to see which one performs better. More specifically, the two variations of the software program are compared by providing the two variants (e.g., Variant A and Variant B) to similar users at substantially the same time. The variation that exhibits the most positive user interaction is typically considered to be the best variation, and may be selected as the only software program for users going forward.

A/B testing has gained in popularity as an approach to optimize software products and gain improved customer satisfaction, which may result in enhanced revenue and conversion rates, for example. However, the implementation of A/B testing is plagued with challenges that could lead to incorrect conclusions and sub-optimal product optimization.

The A/B testing process initially defines a feature/metric that needs to be improved as measured by attributes such as enhanced usage. The next step is to serve different designs of that feature to non-overlapping samples of customers using the live product and measure targeted feature usage. During the process, the experiments may be tightly controlled to ensure that the gains/losses are attributed to a singular product change. At the end of an experiment, the design that leads to an improvement in the targeted metric is recommended for adoption.

Although the adopted change in the product may lead to an improvement in the targeted feature usage, what has generally been observed in practice is that the improvement is mostly at the cost of other features being ignored. In essence, a high use of a targeted feature cannibalizes the usage of other features which leads to a local improvement at the cost of overall holistic improvement, which converges onto sub-optimal design optimization.

One way to overcome the impact of cannibalization is to precisely define a holistic customer success metric that can be measured alongside other features/metrics during the A/B testing process. In essence, this enables carrying out of experiments targeting local improvements while also ensuring that the local improvements are not at the cost of holistic overall improvements. That is, the changes that lead to local feature improvement by cannibalization can be ignored if they reduce an overall customer satisfaction metric. Such an overall improvement may also be referred to as a maximum improvement in user satisfaction.

Some solutions to this issue have involved defining a holistic overarching customer success metric. However, such a metric definition has been hand-crafted with reliance on the background knowledge of experts to select prioritized lists of metrics and develop some ratio of such metrics with each other. For example, time-to-first-engaged-document (TTFED) is a holistic metric that measures how quickly a user is able to engage with a document after conducting a search. The engagement with the document is weighted differently for different actions or usage of features such as a download, a sending of an email, a print action, or the like. The precise weights for different feature usage are hand-crafted and rely on the discretion of experts. Similarly, a time-to-success (TTS) metric as a holistic metric has also been utilized.

The present disclosure uses machine learning to define an overarching and holistic score of user success, in place of multiple metrics derived from multiple different user behaviors. As will be described in greater detail herein, all measured metrics are aggregated and a machine learning algorithm picks and chooses a combination of metrics that define success and failure. The precise definition of the success and failure is established by a ground truth in-product customer survey, which is used as an input to the predictive machine learning algorithm. This overall methodology, which may be referred to herein as the Sigma Methodology, results in a Product Success Score (PSS), which may also be referred to as a Sigma Score.

The Sigma Methodology and Product Success Score described here has various uses and benefits for application to web analytics including AB testing and to business intelligence and analytics.

As used herein, the term "real-time" refers generally to tasks that are completed by the various systems, methods, and computer-readable media described herein concurrently with the user's interaction with the software program. That is, the systems, methods, and computer-readable media described herein are capable of obtaining information regarding the user's interaction with the software program while the user is actively using the software program, particularly information pertaining to whether the user's interactions are positive, negative, neutral, or the like, which may be determined (either in real-time or subsequently) using one or more metrics, as described in greater detail herein.

Referring now to the drawings, FIG. 1 depicts an illustrative computing network that depicts components for a system for scoring a user's interaction with a software program according to embodiments shown and described herein. As illustrated in FIG. 1, a computer network 10 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 10 may generally be configured to electronically connect one or more computing devices and/or components thereof. Illustrative computing devices may include, but are not limited to, a user computing device 12a, a server computing device 12b, and an administrator computing device 12c.

The user computing device 12a may generally be used as an interface between a user and the other components connected to the computer network 10. Thus, the user computing device 12a may be used to perform one or more user-facing functions, such as receiving one or more inputs from a user or providing information to the user, as described in greater detail herein. Accordingly, the user computing device 12a may include at least a display and/or input hardware, as described in greater detail herein. In some embodiments, the user computing device 12a may contain the software that is evaluated, as described herein. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c may also be used to input additional data into a corpus of data stored on the server computing device 12b.

The server computing device 12b may receive data from one or more sources, generate data, store data, index data, search data, and/or provide data to the user computing device 12a in the form of a software program, questionnaires, and/or the like.

It should be understood that while the user computing device 12a and the administrator computing device 12c are depicted as personal computers and the server computing device 12b is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, components, and/or the like.

Figure 2:
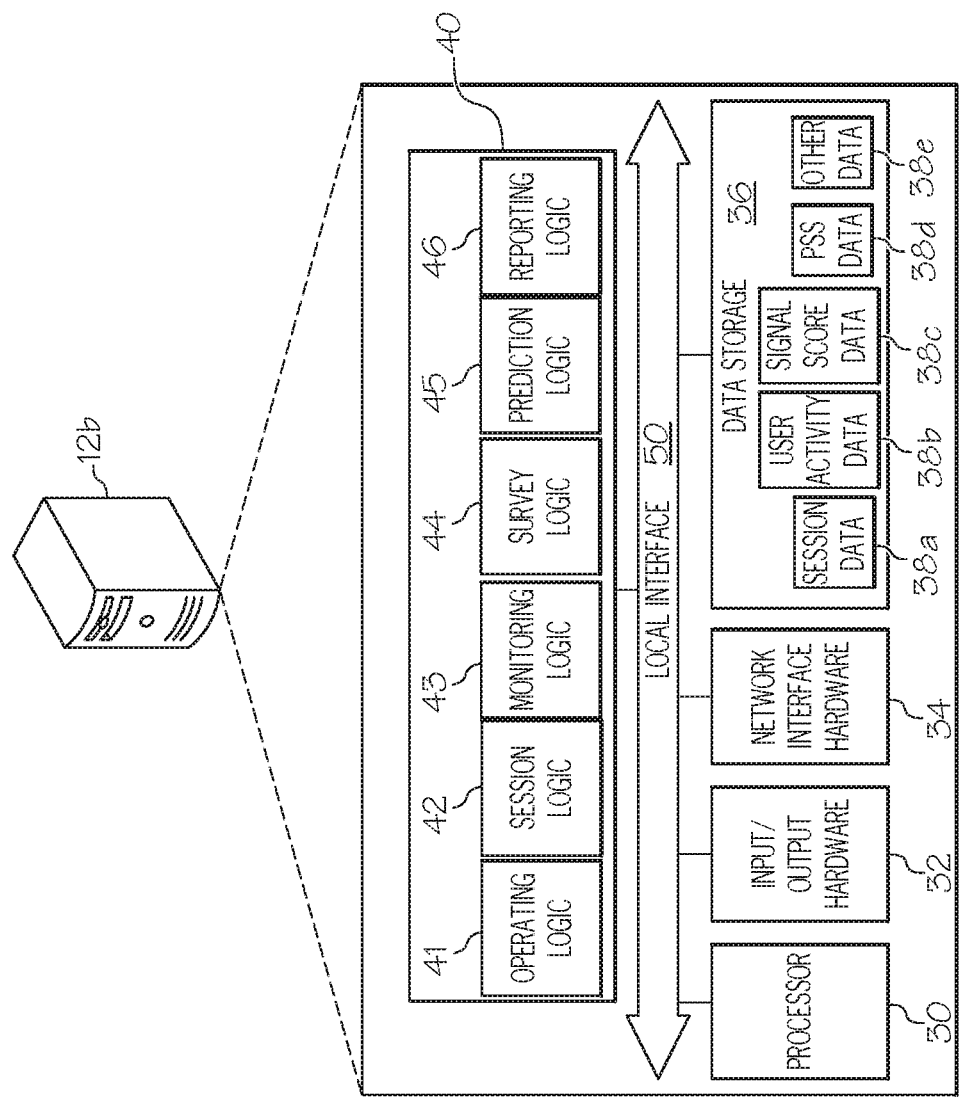
FIG. 2 schematically depicts the server computing device from FIG. 1, further illustrating hardware and software that may be used in scoring a user's interaction with a software program in real time according to one or more embodiments shown and described herein.

FIG. 2. depicts the server computing device 12b, from FIG. 1, further illustrating a system for scoring a user's interaction with a software program in real time. While the components depicted in FIG. 2 are described with respect to the server computing device 12b, it should be understood that similar components may also be used for the user computing device 12a and/or the administrator computing device 12c (FIG. 1) without departing from the scope of the present disclosure.

The server computing device 12b may include a non-transitory computer-readable medium for searching and providing data embodied as hardware, software, and/or firmware, according to embodiments shown and described herein. While in some embodiments the server computing device 12b may be configured as a general purpose computer with the requisite hardware, software, and/or firmware, in other embodiments, the server computing device 12b may also be configured as a special purpose computer designed specifically for performing the functionality described herein. In embodiments where the server computing device 12b is a general purpose computer, the methods described herein generally provide a means of improving a matter that resides wholly within the realm of computers and the internet (i.e., improving the functionality of software).

As also illustrated in FIG. 2, the server computing device 12b may include a processor 30, input/output hardware 32, network interface hardware 34, a data storage component 36 (which may store session data 38a, user activity data 38b, signal score data 38c, Product Success Score (PSS) data 38d, and other data 38e), and a non-transitory memory component 40. The memory component 40 may be configured as a volatile and/or a nonvolatile computer-readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store various processing logic, such as, for example, operating logic 41, session logic 42, monitoring logic 43, survey logic 44, prediction logic 45, and/or reporting logic 46 (each of which may be embodied as a computer program, firmware, or hardware, as an example). A local interface 50 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data (e.g., a device that allows for direct or indirect user interaction with the server computing device 12b). The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data and selectively provide access to the one or more pieces of data. As illustrated in FIG. 2, the data storage component 36 may store session data 38a, user activity data 38b, signal score data 38c, PSS data 38d, and/or other data 38e, as described in greater detail herein.

Included in the memory component 40 are the operating logic 41, the session logic 42, the monitoring logic 43, the survey logic 44, the prediction logic 45, and/or the reporting logic 46. The operating logic 41 may include an operating system and/or other software for managing components of the server computing device 12b. The session logic 42 may provide a software product to the user in the form of an interaction session, such as a research session or the like, as described in greater detail herein. The monitoring logic 43 may monitor a user's interaction with a software product during an interaction session and determine one or more metrics from the user's interaction that are used for performance determination and/or prediction, as described in greater detail herein. The survey logic 44 may provide a post-software experience survey to a user after the user has interacted with a software program. The prediction logic 45 may predict a user's response to software based on historical data. The reporting logic 46 may provide data to one or more users, where the data relates to the evaluation of the interaction between the user and the software program.

It should be understood that the components illustrated in FIG. 2 are merely illustrative and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, as previously described herein, while FIG. 2 is directed to the server computing device 12b, other components such as the user computing device 12a and the administrator computing device 12c may include similar hardware, software, and/or firmware.

As mentioned above, the various components described with respect to FIG. 2 may be used to carry out one or more processes and/or provide functionality for evaluating a user's interaction with a software program. An illustrative example of the various processes is described with respect to FIG. 3.

At step 305, the software program to be evaluated may be provided. The software program may generally be provided in any manner, and is otherwise not limited by this disclosure. For example, the software program may be provided via the internet, such as, for example, a web-based document search engine software product that is provided to users over the internet. As another example, the software program may be a legal research software program that provides a user with an ability to search for and/or discover legal documents, including cases, treatises, trial transcripts, journal articles, and/or the like.

In some embodiments, the software program may require users to authenticate themselves. Authentication may be used for any number of reasons, such as, for example, to verify that a user is authorized to use the software, to ensure the user is provided with a correct version of the software, to determine one or more demographics in which the user is classified, to determine any other groups in which the user may be a member, and/or the like. Authenticating the user may be via any means of authentication now known or later developed. For purposes of simplicity, the present disclosure relates to password based authentication, but it should be understood that other means of authentication may be used without departing from the scope of the present disclosure. Password authentication may generally include receiving a login request from a user at step 310. For example, a user may navigate to a particular website hosting the software program and click a button, enter a username and/or password, provide a digital certificate, passkey, and/or the like, or otherwise indicate that he/she wishes to log into the software program. Accordingly at step 315, a determination may be made as to whether the user's login is authorized. That is, the system may determine whether the user has been adequately identified and/or is authorized to use the software program. If not, the login may be denied at step 320 and the process may return to step 310 when another login request is received. If the user login is authorized, the user session may start at step 325. Starting the user session may generally include granting the user access to the software program. A time stamp or the like may be recorded upon commencement of the user session such that the amount of time the user interacts with the software program is accurately recorded.

Upon commencement of a user session, the user's activity may be recorded at step 330. That is, one or more actions undertaken by the user with the software program may be recorded. In some embodiments, all of the user's interactions with the software program may be recorded. In other embodiments, only a portion of the user's interaction with the software program may be recorded. illustrative examples of interaction or other activity that the system may record include, but are not limited to, mouse cursor location/movements, scrolling position, scrolling speed, button clicks, link clicks, key entries, search terms entered, documents viewed, portions of text viewed, items downloaded, and the like. Data relating to time may also be recorded as part of step 330. Illustrative examples of time that may be recorded include, but are not limited to, the times the user logs into and out of the software program, the amount of time to complete a particular task, the amount of time to completed a plurality of successive tasks, and/or the like. Various user-related data may also be recorded as a part of step 330. For example, a user, when signing up for login credentials that are used to access the software program, may be required to provide demographic information such as, for example, name, age, gender, job title, company size, industry in which the user works, and/or the like.

At step 335, the system may determine one or more metrics, in real-time, that correspond to a user's activity within a software program (i.e., one or more actions undertaken by the user with the software program). Determining one or more metrics generally includes observing a user's interaction with the software program in real-time and determining which ones of a list of metrics corresponds to the user's interaction. Such a determination may be completed, for example, by utilizing a reference file or the like that cross references particular metrics with particular user actions within the software program.

The one or more metrics may generally correspond to the one or more actions undertaken by the user with the software program. That is, a metric may indicate certain characteristics of a particular action completed by a user when interacting with the software and/or a particular aspect of a user's interaction with the software product. Illustrative examples of metrics include, but are not limited to, a number of searches completed by a user, a number of document views completed by a user, a number of reference reports requested by a user, a number of document deliveries requested by a user, a number of filters added and/or removed by a user, a number of searches conducted in a particular content explore, the duration of the session, a total number of engaged documents, a time until a first document was engaged when measured from the beginning of a session, a discounted cumulative gain (DCG) of a session, an amount of time that has elapsed between different searches, an average search page load time, an average document page load time, and the like. In some embodiments, metrics may be grouped into feature categories. illustrative feature categories may include, but are not limited to, informational features, search and discovery features, session navigation features, document use features, research features, time features, errors, and response time features. Illustrative examples of informational features may include, but are not limited to, session ID, date & time, and subclass of customer. Illustrative examples of search and discovery features include, but are not limited to, median document position viewed in a session, average discounted cumulative gain in a session, and average of time to first engaged documents for a session. Illustrative examples of session navigation features may include, but are not limited to, length of session in minutes, use of features in a particular menu item per session, and total number of clicks per session made for any feature. Illustrative examples of document use features may include, but are not limited to, documents accessed through a search page per session, documents that are accessed by non-search features, and documents downloaded per session. Illustrative examples of research features include, but are not limited to, citations copied per session and legal topic summary and legal issue trail reports generated per session. Illustrative examples of time features include, but are not limited to, time between events (e.g., max value in a session, average value in a session, median value in a session), time between searches, and time between document views. An illustrative example of an error may include, but is not limited to, a number of failed deliveries. Illustrative examples of response time features include, but are not limited to, search results page load time (including maximum, average, and median times), document page load times (including maximum, average, and median times), and other page load times.

Metrics that are determined may be defined in advance via any method that is recognized for defining metrics. For example, in some embodiments, metrics may be defined via background research on Net Promoter Score (NPS) feedback, internal surveys, and workshops with various teams to identify a plurality of metrics and/or actions within a software product that are likely to be key contributors to success as well as failure of user sessions. Illustrative metrics may be derived and selected from an expert recommendation and/or a team agreement on a particular metric. Any metric may be defined, provided that the metric is deemed to reflect some meaningful combination of one or more user actions in any session using the software product, and possibly including a record of the response of the software product to user actions, provided that the user actions can be observed and/or recorded in real time.

At step 340, the user activity may be measured based on the determined metrics. That is, the system may measure the one or more interactions undertaken by the user based on the one or more metrics to obtain metric data. Measuring the one or more interactions undertaken by the user may include observing a user action within the software program and qualifying and/or quantifying the action based on the corresponding metric. Such a qualifying and/or quantifying may allow the system to determine whether a user action was positive, negative, or neutral, which can later be used to determine a Product Success Score, as described in greater detail herein.

Certain user tasks may be assigned a weight greater than other user tasks. For example, user tasks that are more indicative of measuring success may be weighted more than tasks that are less indicative of measuring success. In another example, a user task that involves downloading a document may be weighted greater than another user task that involves scrolling through a document. This may be due to the task of downloading a document being more indicative of a positive user action within the software program than the task of scrolling through a document, for example. Accordingly, in order to ensure that certain user tasks are given an appropriate weight relative to other user tasks, the system may weigh one or more user tasks as a portion of measuring the user activity at step 340.

Measuring the user activity according to step 340 may also include determining a user satisfaction with completing one or more tasks. User satisfaction may be relative to a particular interaction with the software program (e.g., whether a user is satisfied with an ease in conducting a search, an ease in viewing content, and/or the like), relative to a plurality of particular interactions with the software program, and/or relative to the software program as a whole. Determining user satisfaction may include analyzing one or more tasks and determining an estimated satisfaction based on the manner in which a user completed a task within the software program, the amount of time the user took to complete a task, whether a user completed or failed to complete a particular task, and/or the like. For example, determining user satisfaction may be based on an amount of time that elapses between the user conducting a search and the user downloading a document as a result of that search, whether any additional searches were necessary, the number of times the user had to click a "next" button to view a group of search results, and/or the like. In some embodiments, determining user satisfaction may be completed using inputs, data, or the like received from a machine learning algorithm that is particularly trained to determine whether a user is satisfied with a particular task. In some embodiments, user satisfaction may be determined based at least in part from feedback received from the user, as described in greater detail herein.

In various embodiments, measuring according to step 340 may include distinguishing effort versus utility for each task completed by the user within the software program. For example, a developer of a software program may wish to minimize the amount of effort needed by a user to complete a task while also maximizing the usefulness of a particular task for a user (e.g., the amount of effort needed to enter in a search term and find a relevant document). That is, if a user is searching for a document within the software program, a developer of the software program may wish to minimize the number of searches a user must run before finding a particular document, as the need to run an increasing number of searches to find a particular document may result in a user that is dissatisfied with the interaction with the software program.

In various embodiments, measuring according to step 340 may further include measuring the one or more actions undertaken by the user based on determined scored categories. Scored categories may be relative to demographic information associated with the user. That is, users having a particular demographic background may be more likely to carry out particular tasks within the software program than other users having a different particular demographic background, may be more likely to carry out particular tasks in particular manners, may be more likely to utilize certain features of the software program, may be more likely to finish a task more quickly, and/or the like. As such, the system may be particularly configured to recognize these demographic factors and measure the user activity accordingly. Illustrative examples of demographic data include, but are not limited to, name, age, gender, job title, company size, industry in which the user works, and/or the like. For example, if a user is a lawyer, demographic information may include the area of law in which the user practices, how long the user has been a lawyer, whether the user works for a solo practice, a small law firm, a large law firm, a regional law firm, a national law firm, an international law firm, a corporate in-house legal department, or the like, whether the user is an associate, a partner, a staff attorney, a general counsel, or the like, a particular area of law in which the user practices, and/or the like. The system may determine the class of users in which the user is located based on the demographic data of the user, categorize the user accordingly, and then generate a scored category that can be used for the purposes of measuring the user activity appropriately.

Figure 3:
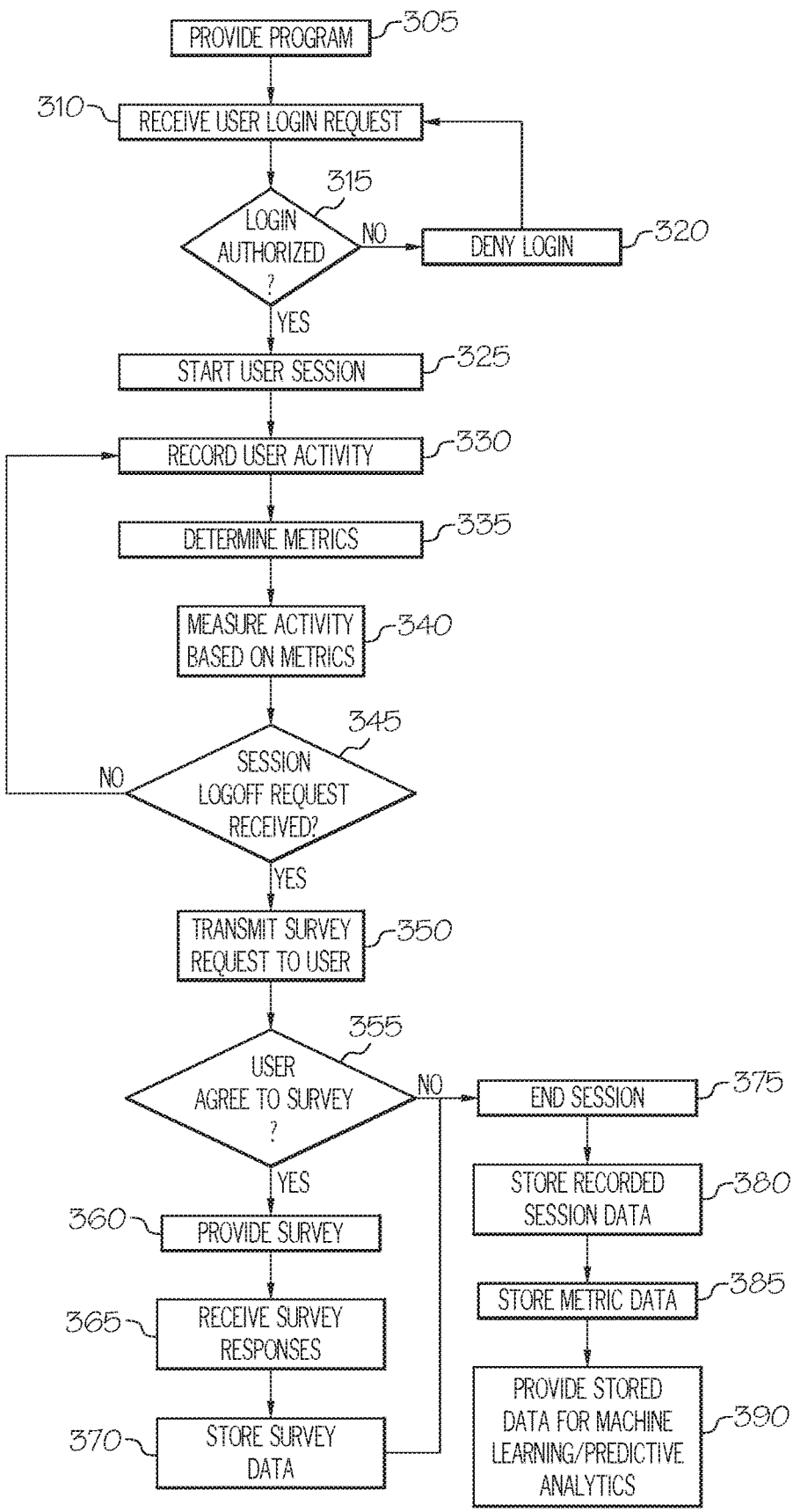
FIG. 3 depicts a flow diagram of an illustrative method of obtaining recorded session data, determining metrics, and measuring metrics according to one or more embodiments shown and described herein.

As described hereinabove, the metrics may be determined and/or measured according to steps 335 and 340 in real-time while the user session is ongoing, as depicted in FIG. 3. However, it should be understood that this is merely illustrative. That is, in other embodiments, the metrics may be determined and/or measured according to steps 335 and 340 at other times, such as after the user session has been completed. In such embodiments, the metrics may be determined and/or measured by evaluating the recorded user activity, which may be stored as session data, as described in greater detail herein. It should be understood that, when such metrics are determined and/or measured after the activity has been completed, such metrics determination and/or measurement is still based on actual activity that occurred during a user session and not based on activity that occurred after a user session, such as instances where a user is requested to recall his/her interactions with the software program to provide feedback.

Once a user has completed a session with the software program, the user may log off or log out of the software. For example, a user may click a "log off" button or a similar button, close the software program, close a browser window running the software program, and/or the like. In some embodiments, the software program may determine that the session has been idle for a period of time and may automatically log the user out of the software program, provide a prompt as to whether the user wishes to continue to use the software program, and/or the like. A determination of whether the user is to be logged out of the software program may be completed at step 345. If the user is still actively using the software or has not completed a request to log out, the process may repeat at step 330 until a logout request or an affirmative logout determination has been received. At such time, the process may proceed to step 350.

in some embodiments, one or more portions of steps 325-345 may be completed using various instructions included within the operating logic 41, the session logic 42 and/or the monitoring logic 43 (FIG. 2) as described herein. In some embodiments, one or more portions of steps 325-345 may be completed using instructions included within other logic, including other logic not specifically described herein.

In some embodiments, it may be necessary to obtain post-software interaction input from the user in order to quantify various portions of the recorded user activity, determine relevant metrics, determine irrelevant metrics, and/or the like. In such embodiments, a survey request may be transmitted to the user at step 350. For example, once the user has logged out of the software program, a pop-up box or the like may be presented to the user, where the pop up box asks the user if the user wishes to participate in a survey regarding the user's experience. Such a request may be particularly used in embodiments where completion of a post-software interaction session survey is optional.

At step 355, a determination may be made as to whether the user has agreed to the survey, If so, the process may proceed to step 360. If not, the process may proceed to step 375. Such steps will be described in greater detail hereinbelow.

It should be understood that, in some embodiments, a user may be required to answer a survey after a user session has been completed. In such embodiments, steps 350 and 355 may be omitted and the process may immediately proceed to step 360.

At step 360, the survey may be provided to the user, and at step 365, the user's response to the survey may be received, The survey is generally provided after the user has completed an interaction session with the software program. As such, the survey may ask questions regarding the user's opinion of the interaction with the software program throughout the entire interaction. The type of survey and the content contained within the survey is not limited by this disclosure, and may be any survey or content therein. In some embodiments, the survey may ask specific questions regarding particular aspects of the software program. In other embodiments, the survey may ask more generalized questions about the software program as a whole. The responses may be received as text, selection of one or more pre-prepared answers, and/or the like. Other types of survey responses are contemplated and included within the scope of the present disclosure.

While FIG. 3 depicts providing the survey and receiving the survey responses as occurring after the user has completed a session, the present disclosure is not limited to such. In addition, the present disclosure is not limited to a single question and answer session. That is, in some embodiments, at least portions of the survey may be conducted during the user interaction with the software. For example, a user may complete a particular task while interacting with the software program, which may result in a survey question being presented in response to such a task completion. For example, if a user clicks on a particular button, a survey may be instantly presented to the user asking the user why that particular button was selected.

Once the survey responses have been received, they may be stored at step 370. In some embodiments, the survey responses may be stored as survey data, which may be included within the data storage component 36 (FIG. 2), as described herein. For example, the survey responses may be stored as a portion of the signal score data 38*c,* and/or the other data 38*e* (FIG. 2).

At step 375, once all of the survey questions have been received or if the user has declined to complete a survey, the session may end at step 375. It should be understood that in some embodiments, one or more portions of steps 350-375 may be completed using various instructions included within the operating logic 41, the session logic 42, the monitoring logic 43, and/or the survey logic 44 (FIG. 2) as described herein. In some embodiments, one or more portions of steps 350-375 may be completed using instructions included within other logic, including other logic not specifically described herein.

At step 380, any data generated or obtained from recording the user session may be stored. For example, in some embodiments, a recording of the user session, including all of the interaction between the user and the software program, may be stored within one or more portions of the data storage component 36, including, but not limited to, the session data 38*a,* the user activity data 38*b,* and the other data 38*e* (FIG. 2). Such data may be stored so that it can be retrieved in the future for analysis, prediction, scoring, and/or the like, as described herein.

At step 385, any data generated or obtained from determining and/or measuring the one or more metrics may be stored. For example, in some embodiments, data relating to the one or more metrics may be stored within one or more portions of the data storage component 36, including, but not limited to, the session data 38*a,* the user activity data 38*b,* the signal score data 38*c,* and the other data 38*e* (FIG. 2). Such data may be stored so that it can be retrieved in the future for analysis, prediction, scoring, and/or the like, as described herein.

Figure 4:
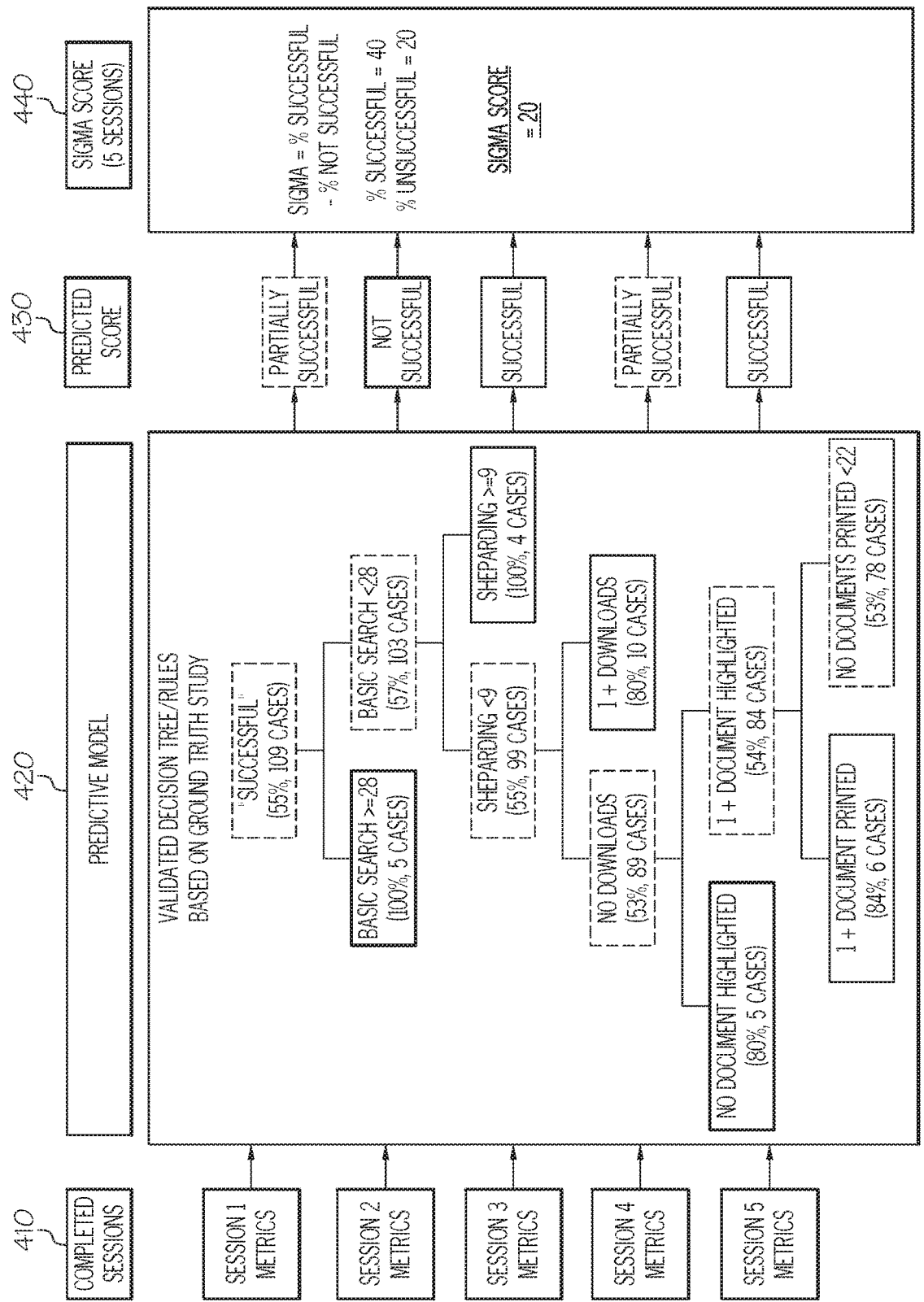
FIG. 4 schematically depicts the flow of an illustrative general determination of a Product Success Score according to one or more embodiments shown and described herein.

The recorded data may then be used for the purposes of machine learning and/or predictive analytics, such as, for example, combining interaction session scores to obtain a combined score, determining an overall user satisfaction based on the combined score (e.g., whether users in general are satisfied with the software program), determining a user satisfaction for a particular class of users, reporting user satisfaction, and/or predicting user satisfaction for improvements to the software program (including a maximum improvement, which represents an overall maximum improvement score). As such, at step 390, the stored data (including the survey data, the recorded session data, and the metric data) may be provided for machine learning and/or predictive analytics. That is, the stored data may be provided as an input for one or more machine learning algorithms and/or predictive analytic algorithms. The machine learning and/or predictive analytics may use the stored data to determine the nature of the user's interaction of the software program, including interactions that were positive, interactions that were negative, and/or the like, such that the data can be used to determine how the software program should be implemented, as described in greater detail herein. For example, in some embodiments, the recorded data may be utilized to determine a Product Success Score (PSS). FIG. 4 depicts an illustrative overall flow diagram of a PSS determination according to an embodiment.

As shown in FIG. 4, all of the data obtained from each completed session (i.e., each recorded interaction between a user and the software program, including a combined score) may be retrieved from storage at step 410. For example, the information may be retrieved from within one or more portions of the data storage component 36, including, but not limited to the session data 38a, the user activity data 38b, the signal score data 38c, and the other data 38e (FIG. 2). The retrieved data may be fed into a supervised learning model at step 420 for utilization by a machine learning library to determine the success of the user interaction, including the interaction as a whole and specific interactions with various portions or features of the software. One such example of a machine learning library utilizing the supervised learning model includes, but is not limited to, the Python scikit-learn Machine Learning Library (offered by various sponsors at http://scikit-learn.org/stable/). The supervised learning model that is used by the machine learning library is not limited by this disclosure, and may generally be any machine learning model that can be used to predict how a user responds in a particular situation, such as a proposed software update or the like.

Figure 5:
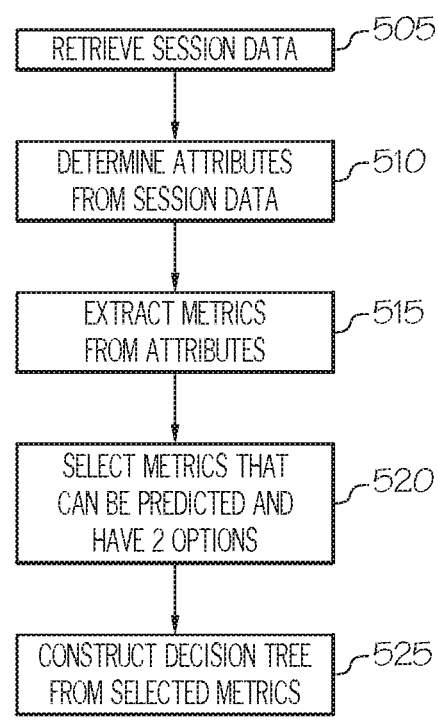
FIG. 5 schematically depicts a flow diagram of an illustrative method of constructing a decision tree according to one or more embodiments shown and described herein;1
Figure 6:
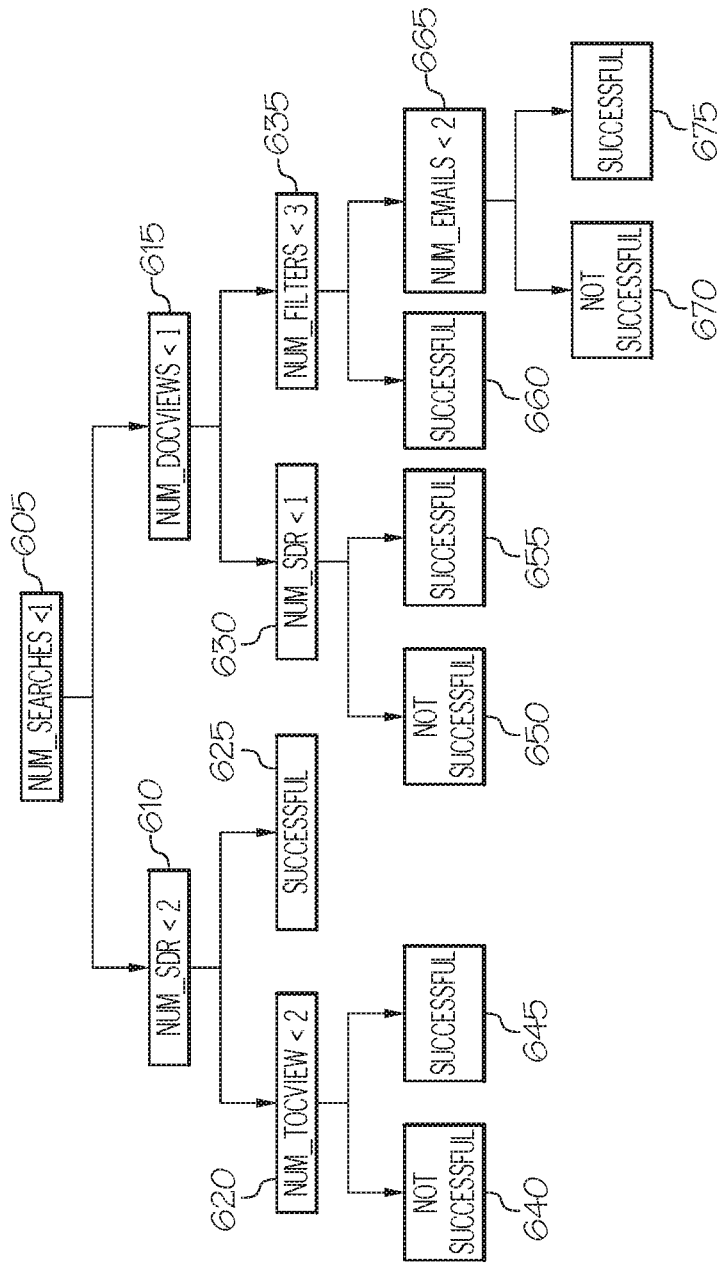
FIG. 6 schematically depicts an illustrative decision tree according to one or more embodiments shown and described herein.

One illustrative example of a supervised learning model that may be utilized is a decision tree model. A decision tree model is a model of computation containing a plurality of branching operations. Each branching operation includes a test or query that asks a question and the tree branches in two or more directions depending on the answer to the question. FIGS. 5 and 6 depict a method of generating an illustrative decision tree model and the generated decision tree model, respectively.

As shown in FIG. 5, session data may be retrieved at step 505. For example, the session data 38a of the data storage 36 (FIG. 2) may be accessed and information may retrieved therefrom. Various attributes may be determined from the session data at step 510. Attributes are not limited by this disclosure, and may be any attributes of a particular session that may be extracted from that particular session. For example, the attributes may be particular user actions, particular interface responses, and/or the like. The attributes generally relate to actions, interface responses, and/or the like from which the metrics are determined, as previously described herein. Accordingly, at step 515, the metrics are extracted from the attributes. Metrics that can be categorized as having one of two results are extracted at step 520. For example, as shown in FIG. 6, certain metrics that may have one of two results include instances when the number of searches is/is not less than 1 (box 605), instances when the session duration is/is not less than 2 minutes (box 610), instances where the number of document views is/is not less than 1 (box 615), instances where the number of table of contents views is/is not less than 2 (box 620), instances where the session duration is/is not less than 1 minute (box 630), instances where the number of filters selected is/is not less than 3 (box 635), and/or the number of emails sent is/is not less than 2 (box 665).

Referring again to FIG. 5, at step 525, the decision tree may be constructed from the selected metrics. The decision tree may be arranged logically as shown, for example, in FIG. 6. Accordingly, each of the selected metrics may represent a particular node in the tree (e.g., boxes 605, 610, 615, 620, 630, 635, and 665). At each node, two answers are possible, which results in two branches extending from each node. However, it should be understood that only two possible answers are shown for each node for the purposes of brevity. That is, for some selected metrics, more than two possible answers (and thus more than two branches) may extend from each node. As a result of the decision tree generation, the machine learning algorithms described herein may traverse the decision tree by responding to the question posed at each node to end up at a successful result (e.g., boxes 625, 645, 655, 660, and 675) or an unsuccessful result (e.g., boxes 640, 650, and 670). It should be understood that this decision tree, including the successful and not successful results, is merely illustrative and the present disclosure is not limited to such. Another illustrative example of a decision tree is shown and described herein with respect to FIG. 8.

Figure 7:
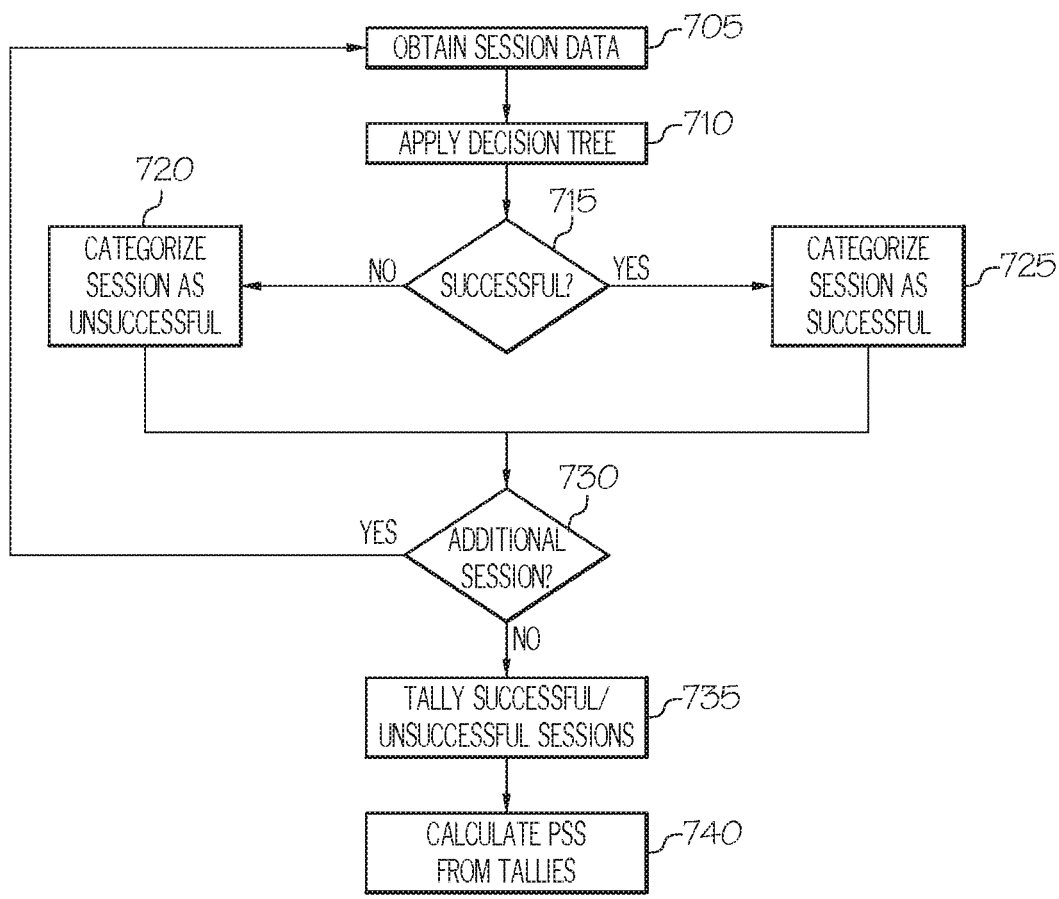
FIG. 7 depicts an illustrative method of traversing a decision tree to determine a product success score according to one or more embodiments shown and described herein.

Determination of the PSS score as described in FIG. 4 may be completed using a decision tree, as shown for example in FIG. 7. More specifically, session data for a particular session may be obtained at step 705 and the decision tree may be applied at step 710 to determine at step 715 as to whether the particular session was successful. That is, the decision tree may be traversed according to information contained within the session data. If traversing the decision tree results in a not successful session, the session may be categorized as unsuccessful at step 720. If traversing the decision tree results in a successful session, the session may be categorized at step 725.

The decision tree may be applied to each session that is completed in a particular time period, such as a particular day, a particular hour, and/or the like. As such, at step 730, a determination may be made as to whether additional sessions need to be analyzed using the decision tree. If so, the process may return to step 705 for each session. If not, the process may proceed to step 735 whereby the successful and unsuccessful sessions are tallied and the PSS is calculated therefrom at step 740. As previously described herein, the PSS may be calculated, for example, by subtracting the number of unsuccessful sessions from the number of successful sessions.

Figure 8:
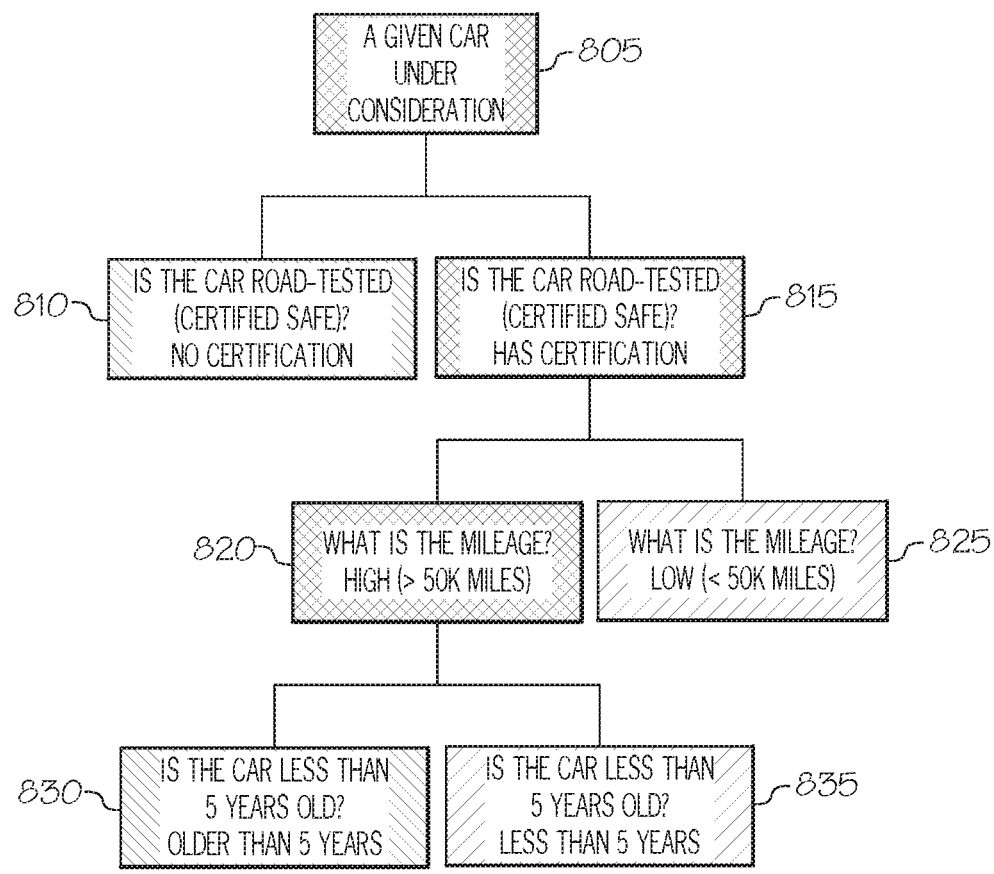
FIG. 8 depicts another illustrative decision tree according to one or more embodiments shown and described herein.

FIG. 8 depicts an illustrative decision tree that may be used for the purchase of a vehicle, depicted solely for the purposes of showing how the nodes of a decision tree are determined and arranged in a logical flow. Accordingly, it should be understood that the decision tree provided in FIG. 8 is merely for illustrative purposes of showing how a decision tree works, and is not related to the embodiments described herein. Such a decision tree shows the user's decision making path as the user decides to purchase a car. For example, a company providing a software program for purchasing a car could construct such a decision tree based on observing historical user interactions with the software. By building this model, the company can learn of specific things that they would need to change to improve their business. As such, at node 805 (neutral node), a given car under consideration is selected. A next level down may determine whether the car is road-tested and certified to be safe. If the car is not road tested and certified safe, the historical markers may indicate that a user will not or is not likely to purchase the vehicle at node 810 (negative node). If the car is road tested and certified safe at node 815 (neutral node), the decision tree may proceed to the next level down, at which a determination is made as to the likelihood of purchase based on mileage. If the mileage is low (e.g., less than about 50,000 miles), the decision tree may indicate at node 825 that the user will buy or is likely to buy the car (positive node). If the mileage is high (e.g., greater than about 50,000 miles) at node 820 (neutral node), the decision tree may proceed to the next level down, at which a determination is made as to the likelihood of purchase based on age of the car. If the car is greater than a certain age (e.g., about 5 years old) at node 830 (negative node), the historical markers may indicate that a user will not or is not likely to purchase the vehicle. If the car is less than the certain age at node 835 (positive node), the historical markers may indicate that the user is likely or will purchase the car. Such a decision tree may similarly be used to determine the success of one or more user interactions with the software program, as mentioned in the various embodiments described herein.

Success of a particular user interaction session with a software program may be identified, for example, through a combination of the metrics measured within the software program, which are utilized by the various modeling processes, such as the decision tree modeling, described hereinabove. For example, certain ones of the metrics described herein may be used to determine value, such as how much the user is engaging with the software program and/or particular portions thereof. In another example, certain ones of the metrics described herein may be used to determine effort, such as how much work a user must expend working with the software program/navigating through the software program to achieve his/her goals.

Other examples of supervised learning models include, but are not limited to, support vector machine (SVM), logistic regression, perceptron, decision trees (as described herein), random forests, gradient boosted trees, and/or the like. Such supervised learning models are generally understood and are not described in greater detail herein. For each model, one or more hyper-parameter values may be tested, such as, for example, Grid Search, Random Search, and Bayesian hyper parameter optimization.

Referring again to FIG. 4, the number of end result nodes that are reached for each user (e.g., positive, neutral, or negative) after the modeling are combined and aggregated at step 430. At step 440, a Sigma score is determined based on the aggregated result of the end nodes that are reached. The Sigma score may be, for example, the percentage of positive nodes that are reached as an end result minus the percentage of negative nodes, with the neutral nodes providing no weight. As such, for 5 user interaction sessions with a software program in which two result in a positive end result, one result in a negative end result, and two are neutral, the Sigma score would be 40% (2 of 5) minus 20% (1 of 5), which equals a score of 20.

Figure 9:
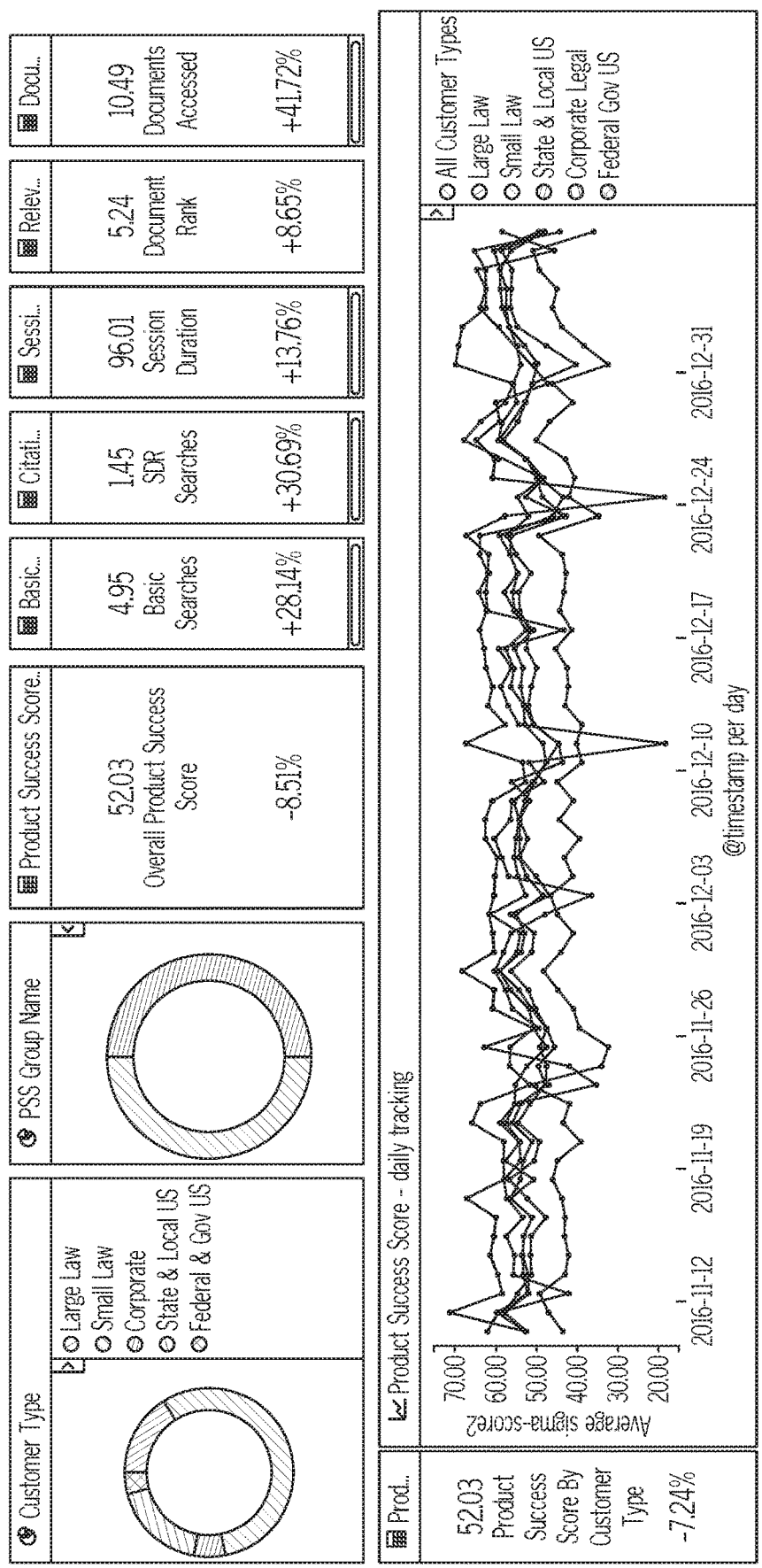
FIG. 9 depicts an illustrative screen shot of a Product Success Score report according to one or more embodiments shown and described herein.

The methodology for obtaining the Sigma Score/PSS as presented in FIG. 4 is merely illustrative. As such, other methodology for obtaining a Sigma score/PSS now known or later developed may also be used without departing from the scope of the present application. In some embodiments, the PSS may be presented as a report, as shown, for example, in FIG. 9. The report may provide a PSS for one or more features of a software program, and may further be categorized based on various user characteristics, particular periods of time, and/or the like. Program instructions for generating the report may be contained within the reporting logic 46 (FIG. 2), for example.

It should be understood that as the software program evolves, the learning models must be updated to ensure they accurately reflect user response to the software program. As such, the processes described herein may be continuously used to update the learning models to ensure that the machine learning processes have the most up-to-date information in making predictions.

Once the data obtained from the real-time monitoring of the interaction between the user and the software program has been used for the machine learning libraries, the learned machine may be used to make predictions as to how future interactions between a user and the software may occur so as to more accurately measure user activity relative to the determined metrics, as described in greater detail herein.

Figure 10:
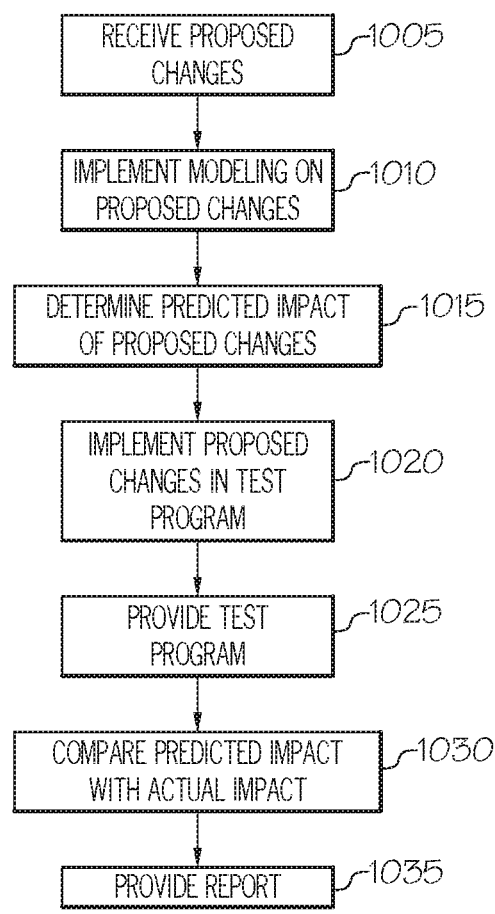
FIG. 10 depicts a flow diagram of an illustrative method of monitoring and determining predictive indicators of a user's interaction with a software program in real time according to one or more embodiments shown and described herein.

In addition, the data may be used to provide reports regarding user satisfaction with the software program and/or portions thereof, to test expected user satisfaction with updated versions of the software program or new software programs, and/or the like. For example, FIG. 10 depicts an illustrative example method of monitoring and determining predictive indicators of a user's interaction with a software program.

At step 1005, the system may receive proposed changes to a software program, such as a change to a particular interface, an addition or deletion of features, and/or the like. The system may implement modeling using the machine learning data on the proposed changes to the software program at step 1010. That is, the system may input the proposed changes as data into a machine learning algorithm such that the algorithm can predict a particular user response to the proposed changes.

At step 1015, the system may determine a predicted impact of the proposed changes based on, for example, outputs received from the machine learning. To verify the accuracy of the machine learning and/or to update the machine learning to ensure future accuracy, the proposed changes may be implemented to the software program at step 1020 and provided to one or more users at step 1025. The software program may be provided according to the processes described herein with respect to FIG. 3 so as to determine the results of user satisfaction with the proposed changes. At step 1030, a comparison of the predicted impact may be completed and a report may be provided regarding the comparison and/or the results at step 1035.

It should now be understood that the systems, methods, and computer-readable media described herein measure, in real-time, a user's interaction with a software product in order to determine the user's satisfaction with the software product. More specifically, the systems, methods, and computer-readable media described herein measure the user's interaction by recording each individual user interaction session that occurs between the user and the software product. During the recording of the session, the systems, methods, and computer-readable media described herein determine and observe one or more metrics that are used as indicators of the user's satisfaction with the software products. The observed metrics are then combined with the user's post-session feedback (if any) to obtain a score. The score can then be aggregated with other scores, and the aggregate can be used to determine how users responded to particular features of a software product and for predicting how users may respond in the future (either to the same features or to proposed new features).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for collecting and processing interaction data used as an input for one or more of a machine learning algorithm and a predictive analytic algorithm, the method comprising:
   recording, by a processing device, one or more electronic interactions between a user and a software program via a user interface to obtain recorded session data;
   estimating, by the processing device in real-time, a satisfaction of the user with the software program based on one or more metrics determined from at least one of the one or more electronic interactions between the user and the software program;

measuring, by the processing device, the one or more electronic interactions between the user and the software program based on the one or more metrics to obtain metric data;

providing, by the processing device, the recorded session data and the metric data as an input for the one or more of the machine learning algorithm and the predictive analytic algorithm, wherein the one or more of the machine learning algorithm and the predictive analytic algorithm scores an individual interaction session to determine a nature of the one or more electronic interactions between the user and the software program and the satisfaction of the user;

combining the scored individual interaction session with a plurality of other scored individual interaction sessions to obtain a combined score;

predicting one or more improvements to the software program that results in a maximum improvement in the satisfaction of the user based on the combined score, the one or more improvements comprising at least one of updates to the software to replace old software, updates to revise an interface of the software, updates to remove features of the software, or updates to add new features to the software; and implementing the software program with the one or more improvements to verify an accuracy of the machine learning algorithm and to update the machine learning algorithm.

2. The method of claim 1, further comprising:
determining an overall user satisfaction with one or more of the software program and a feature of the software program based on the combined score; and
reporting the overall user satisfaction.

3. The method of claim 1, further comprising:
determining the satisfaction of the user with one or more of the software program and a feature of the software program based on the combined score for a class of users; and
reporting the satisfaction of the user for the class of users.

4. The method of claim 1, wherein measuring the one or more electronic interactions undertaken by the user comprises one or more of: weighing one or more user tasks; determining the satisfaction of the user with completing one or more user tasks; and distinguishing effort versus utility for each of the one or more user tasks.

5. The method of claim 1, wherein the individual interaction session begins when the user logs into the software program and ends when the user logs out of the software program.

6. The method of claim 5, wherein measuring the one or more electronic interactions undertaken by the user is based on the one or more scored categories.

7. The method of claim 1, further comprising:
determining, by the processing device, one or more classes of users in which the user is located based on user related demographic data;
categorizing, by the processing device, the user in one or more categories based on the one or more classes; and
scoring, by the processing device, the one or more categories to obtain one or more scored categories.

8. The method of claim 1, wherein the one or more of the machine learning algorithm and the predictive analytic algorithm utilizes a decision tree logic model.

9. The method of claim 1, further comprising:
receiving, by the processing device, a plurality of scores from the one or more of the machine learning algorithm and the predictive analytic algorithm;

determining, by the processing device, a Sigma score from the plurality of scores.

10. The method of claim 1, wherein the one or more of the machine learning algorithm and the predictive analytic algorithm scores the individual interaction session to determine the satisfaction of the user based on an amount of time that elapses between the user conducting a search and the user downloading a document as a result of the search, whether any additional searches were necessary, or a number of times the user had to click a "next" button to view a group of search results.

11. A system that collects and processes interaction data used as an input for one or more of a machine learning algorithm and a predictive analytic algorithm, the system comprising:
a processing device; and
a non-transitory, processor-readable storage medium comprising one or more programming instructions stored thereon that, when executed, cause the processing device to:
record one or more electronic interactions between a user and a software program via a user interface to obtain recorded session data,
estimate a satisfaction of the user with the software program based on one or more metrics determined from at least one of the one or more electronic interactions between the user and the software program,
measure the one or more electronic interactions between the user and the software program based on the one or more metrics to obtain metric data,
provide the recorded session data and the metric data as an input for the one or more of the machine learning algorithm and the predictive analytic algorithm, wherein the one or more of the machine learning algorithm and the predictive analytic algorithm scores an individual interaction session to determine a nature of the one or more electronic interactions between the user and the software program and the satisfaction of the user,
combine the scored individual interaction session with a plurality of other scored individual interaction sessions to obtain a combined score,
predict one or more improvements to the software program that results in a maximum improvement in the satisfaction of the user based on the combined score, the one or more improvements comprising at least one of updates to the software to replace old software, updates to revise an interface of the software, updates to remove features of the software, or updates to add new features to the software, and
implement the software program with the one or more improvements to verify an accuracy of the machine learning algorithm and to update the machine learning algorithm.

12. The system of claim 11, wherein the non-transitory, processor readable storage medium further comprises one or more programming instructions stored thereon that, when executed, cause the processing device to:
determine an overall user satisfaction with one or more of the software program and a feature of the software program based on the combined score; and
report the overall user satisfaction.

13. The system of claim 11, wherein the one or more programming instructions that, when executed, cause the processing device to measure the one or more electronic interactions undertaken by the user further cause the processing device to complete at least one of the following:

weigh one or more user tasks; determine the satisfaction of the user with completing one or more user tasks; and distinguish effort versus utility for each of one or more user tasks.

14. The system of claim 11, wherein the individual interaction session begins when the user logs into the software program and ends when the user logs out of the software program.

15. The system of claim 11, further comprising one or more programming instructions that, when executed, cause the processing device to:
   determine one or more classes of users in which the user is located based on user related demographic data;
   categorize the user in one or more categories based on the one or more classes; and
   score the one or more categories to obtain one or more scored categories.

16. The system of claim 15, wherein measuring the one or more electronic interactions undertaken by the user is based on the one or more scored categories.

17. The system of claim 11, wherein the one or more of the machine learning algorithm and the predictive analytic algorithm utilizes a decision tree logic model or a supervised learning based predictive model.

18. The system of claim 11, further comprising one or more programming instructions that, when executed, cause the processing device to:
   receive a plurality of scores from the one or more of the machine learning algorithm and the predictive analytic algorithm;
   determine a Sigma score from the plurality of scores.

19. A non-transitory, computer-readable storage medium that is operable by a computer to collect and process interaction data used as an input for one or more of a machine learning algorithm and a predictive analytic algorithm, the non-transitory, computer-readable storage medium comprising one or more programming instructions stored thereon for causing a processing device to:
   record one or more electronic interactions between a user and a software program via a user interface to obtain recorded session data,
   estimate a satisfaction of the user with the software program based on one or more metrics determined from at least one of the one or more electronic interactions between the user and the software program,
   measure the one or more electronic interactions between the user and the software program based on the one or more metrics to obtain metric data,
   provide the recorded session data and the metric data as an input for the one or more of the machine learning algorithm and the predictive analytic algorithm, wherein the one or more of the machine learning algorithm and the predictive analytic algorithm scores an individual interaction session to determine a nature of the one or more electronic interactions between the user and the software program and the satisfaction of the user,
   combine the scored individual interaction session with a plurality of other scored individual interaction sessions to obtain a combined score,
   predict one or more improvements to the software program that results in a maximum improvement in the satisfaction of the user based on the combined score, the one or more improvements comprising at least one of updates to the software to replace old software, updates to revise an interface of the software, updates to remove features of the software, or updates to add new features to the software, and
   implement the software program with the one or more improvements to verify an accuracy of the machine learning algorithm and to update the machine learning algorithm.

20. The non-transitory, computer-readable storage medium of claim 19 further comprising one or more programming instructions stored thereon for causing the processing device to:
   determine one or more classes of users in which the user is located based on user related demographic data;
   categorize the user in one or more categories based on the one or more classes;
   score the one or more categories to obtain one or more scored categories;
   receive a plurality of scores from the one or more of the machine learning algorithm and the predictive analytic algorithm; and
   determine a Sigma score from the plurality of scores.

* * * * *